No. 613,611. Patented Nov. 1, 1898.
M. THOMPSON.
COLLAPSIBLE HANDLE FOR SAUCEPANS, POTS, &c.
(Application filed Aug. 22, 1898.)
(No Model.)

Witnesses
Percy C. Bowen
John Chalmers Toleson

Inventor
M. Thompson
by Wilkinson & Fisher,
Attorneys.

THE NORRIS PETERS CO., PHOTO-LITHO., WASHINGTON, D. C.

UNITED STATES PATENT OFFICE.

MARTIN THOMPSON, OF LATROBE, TASMANIA.

COLLAPSIBLE HANDLE FOR SAUCEPANS, POTS, &c.

SPECIFICATION forming part of Letters Patent No. 613,611, dated November 1, 1898.

Application filed August 22, 1898. Serial No. 689,249. (No model.)

*To all whom it may concern:*

Be it known that I, MARTIN THOMPSON, a subject of the Queen of the United Kingdom of Great Britain and Ireland, residing at Latrobe, in the Colony of Tasmania, have invented certain new and useful Improvements in Detachable Collapsible Handles for Saucepans, Pots, and Like Vessels; and I do hereby declare the following to be a full, clear, and exact description of the invention, such as will enable others skilled in the art to which it appertains to make and use the same.

The object of this invention is to provide a convenient handle or means of lifting, carrying, supporting, and tilting saucepans, flowerpots, fern-tubs, and a variety of other vessels or articles which need not be enumerated, but which either have no handles or have handles which on account of the weight, size, or shape of the vessel or article are less convenient to use than this invention.

The handle I employ is or may be manufactured entirely of wire of sufficient stoutness to bear the strains for which it is intended, each handle being adapted to be adjusted to fit vessels of several—*i. e.*, two or more—sizes in circumferential measurement.

In attaching my handle to a vessel I secure its horizontal band (or one of its bands) underneath the lip, flange, hoop, ears, or other protuberant part by which the vessel is characterized, preferably near the upper end of such vessel. The vessel is then so encircled as to be larger above the band than just below it. Consequently my invention is not applicable for attachment to some vessels, such as those which have a smooth cylindrical exterior.

Figure 1:
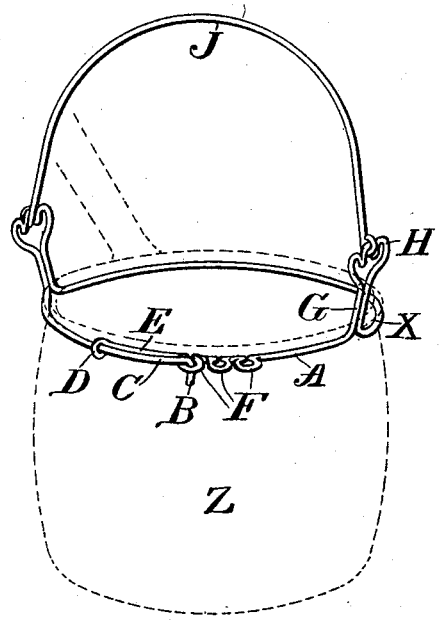
Figure 2:
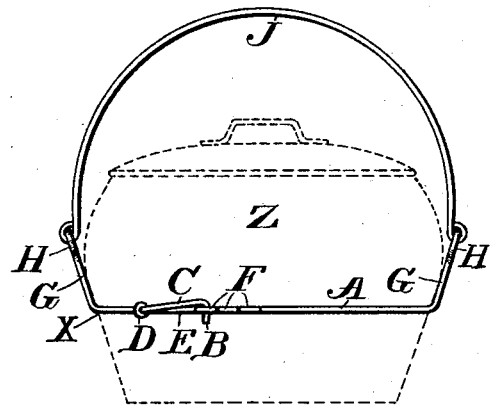
Figure 4:
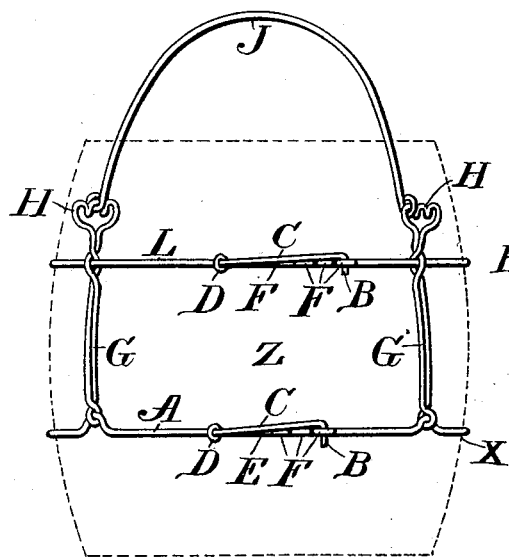
Figure 3:
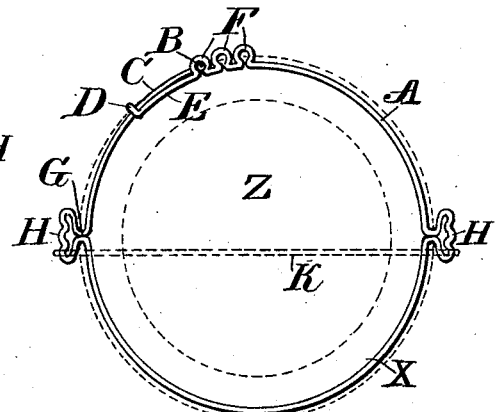

Referring now to the accompanying drawings, Figure 1 shows in perspective a saucepan with my handle attached thereto underneath the projecting upper edge or flange around the rim thereof. Fig. 2 shows in side elevation the handle in Fig. 1 attached to a crock or vessel having no flange or projecting lip around its upper rim, but which bulges out between its ends. Fig. 3 is a plan view of Fig. 2 from beneath. Fig. 4 represents a cask of usual form to which my handle is applied in slightly-modified form—that is, while a main band encircles the cask below its center, as in Fig. 2, the ears or bails which extend above its center are connected by another band for greater strength and security.

In the drawings, $z$ is the vessel, and $x$ is the exterior of the vessel at the part where it is gripped by the band or one of the bands of my appliance. The circumference of the vessel is greater above this band than that of the band itself when the latter is adjusted properly by means of the hook hereinafter described.

A is the gripping-band, having the extremity of one end C passed through an eye D at the extremity of the other end E of said band. The extremity of C is hooked, as shown by B, and this hook cannot pass through eye D. Hence when the hook is touching that eye the band is at the greatest diameter to which it can be adjusted, and it may be used in that position to encircle the vessel to be supported. The ordinary position, however, of the hook is in engagement with one or other of a series of loops F, which are provided on or near the part E, as shown, and by reason of such engagement the band may be adjusted to tightly fit the vessel at the part X. The bails or uprights G of the band extend upward and obliquely outwardly and are each provided with several pockets or the like H to serve as a series of sockets for the reception of the ends of the handle proper, J. The handle J, which may be of any shape preferred, must be somewhat resilient at the ends—*i. e.*, allow the distance between the ends to be contracted— and it is then adapted not only to be placed diametrical, or nearly so, no matter in which of the loops F the hook B may be adjusted, (so altering the diameter of band A,) but the said handle can also be intentionally placed, when required, to one side of the diametrical line. The latter style of support is indicated by the dotted line K on Fig. 3, and it is often useful. For example, where the contents of a heavy vessel have to be gradually tipped or poured out over the upper edge such an arrangement will cause the vessel to tip automatically to a slight extent.

As will be seen from Fig. 2, the obliqueness of uprights G enables the gripping-band to be used when encircling a vessel at a plane which is both at a distance below its widest part and also a distance below its center of gravity. There will, however, be no tendency for the vessel Z to tip over and part company with the band, the pivotal points of sockets H where the handle engages the bails being expressly made to reach higher than the center of gravity of the vessel, and, as will be evident, this height is obtained by means of the use of high bails in such cases. Where these bails are of considerable length, there are two bands used—viz., the gripping-band A and a higher band L—connecting the bails and making the appliance more rigid and more secure in its attachment to the vessel.

What I claim is—

1. In combination in a handle appliance of the class indicated a wire band A with ears or bails, an eye D at one end of said band and a plurality of loops F near said end, and at the other end a hook B adapted to be engaged with one of the loops F, and to be retained by the eye D substantially as set forth.

2. In a handle appliance of the character described, the combination with a wire band, an eye on one end of the said band, a hook on the other end of the said band, means for adjustably securing the two ends of the band together, bails on the said band, and a series of pockets or notches in the said bails; of a handle adapted to engage the said pockets, substantially as described.

3. In a handle appliance of the character described, the combination with a wire band, an eye on one end of the said band, a plurality of loops on the same end of the said band, a hook at the other end of the said band, adapted to engage with one of the said loops and to be retained by the said eye, bails on the said band having a series of pockets or notches, of a handle to engage in the said pockets or notches, substantially as described.

4. In a handle appliance of the character described, the combination of a wire band having ears or bails, an eye on one end of the said band, a plurality of loops near the same end of the said band, a hook at the other end of the said band adapted to engage one of the said loops and be retained by the said eye, and a second band secured to the said bails, substantially as described.

In witness whereof I have hereunto signed my name, this 2d day of July, 1898, in the presence of two subscribing witnesses.

MARTIN THOMPSON.

Witnesses:
  G. G. TURRI,
  W. H. CUBLEY.